US007669242B2

(12) United States Patent
Sahita et al.

(10) Patent No.: US 7,669,242 B2
(45) Date of Patent: Feb. 23, 2010

(54) AGENT PRESENCE MONITOR CONFIGURED TO EXECUTE IN A SECURE ENVIRONMENT

(75) Inventors: Ravi Sahita, Beaverton, OR (US);
Travis Schluessler, Hillsboro, OR (US);
Scott Hahn, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 873 days.

(21) Appl. No.: 11/171,859

(22) Filed: Jun. 30, 2005

(65) Prior Publication Data

US 2007/0005957 A1 Jan. 4, 2007

(51) Int. Cl.
*G06F 11/00* (2006.01)
(52) U.S. Cl. ...................................................... 726/22
(58) Field of Classification Search .................. 726/22, 726/23, 25; 713/164, 165, 166, 188, 180, 713/189, 193
See application file for complete search history.

(56) References Cited

U.S. PATENT DOCUMENTS

| | | | |
|---|---|---|---|
| 5,301,287 A | 4/1994 | Herrell et al. | |
| 5,634,043 A | 5/1997 | Self et al. | |
| 5,687,370 A | 11/1997 | Garst et al. | |
| 5,751,989 A | 5/1998 | Harrison | |
| 5,926,549 A * | 7/1999 | Pinkas | 713/168 |
| 5,991,881 A | 11/1999 | Conklin et al. | |
| 6,105,137 A | 8/2000 | Graunke et al. | |
| 6,163,834 A | 12/2000 | Garcia et al. | |
| 6,321,276 B1 | 11/2001 | Forin | |
| 6,496,847 B1 | 12/2002 | Bugnion et al. | |
| 6,553,438 B1 | 4/2003 | Coffman et al. | |
| 6,567,897 B2 | 5/2003 | Lee et al. | |
| 6,671,791 B1 | 12/2003 | McGrath | |
| 6,684,305 B1 | 1/2004 | Deneau | |
| 6,738,882 B1 | 5/2004 | Gau | |
| 6,751,720 B2 | 6/2004 | Barroso et al. | |
| 6,751,737 B1 | 6/2004 | Russell et al. | |
| 6,760,787 B2 | 7/2004 | Forin | |
| 6,823,433 B1 | 11/2004 | Barnes et al. | |
| 6,931,540 B1 * | 8/2005 | Edwards et al. | 713/188 |
| 6,961,852 B2 | 11/2005 | Craft | |

(Continued)

FOREIGN PATENT DOCUMENTS

WO        WO 9847072        10/1998

OTHER PUBLICATIONS

Non-Final Office Action mailed Jun. 7, 2007 for U.S. Appl. No. 11/173,142.

(Continued)

*Primary Examiner*—Beemnet W Dada
(74) *Attorney, Agent, or Firm*—Blakely, Sokoloff, Taylor & Zafman LLP

(57) ABSTRACT

Embodiments of a method and system for detecting and confirming an agent presence are disclosed herein. The agent presence can be confirmed by a secure management engine configured to execute in a secure execution environment. In various embodiments, a secure execution environment includes a service processor, a virtual partition, and an embedded microcontroller. The management engine is configured to monitor a signal communicated from the agent. Based on the monitored signal, an analysis determines an operational state of the agent. Embodiments include remote management applicability for monitoring a host agent.

19 Claims, 7 Drawing Sheets

U.S. PATENT DOCUMENTS

| | | | |
|---|---|---|---|
| 7,103,779 | B2 | 9/2006 | Kiehtreiber et al. |
| 7,225,325 | B2 | 5/2007 | Rhoades |
| 7,328,453 | B2* | 2/2008 | Merkle et al. ............... 726/23 |
| 7,478,394 | B1 | 1/2009 | de Dinechin et al. |
| 2001/0014157 | A1 | 8/2001 | Hashimoto et al. |
| 2002/0029308 | A1 | 3/2002 | Babaian et al. |
| 2002/0120871 | A1* | 8/2002 | Watkins et al. ............. 713/201 |
| 2002/0129212 | A1 | 9/2002 | Lee et al. |
| 2003/0005239 | A1 | 1/2003 | Dover |
| 2003/0061540 | A1 | 3/2003 | Lee et al. |
| 2003/0135685 | A1 | 7/2003 | Cowan |
| 2003/0159055 | A1* | 8/2003 | Robbins et al. ............ 713/193 |
| 2003/0229808 | A1 | 12/2003 | Heintz et al. |
| 2004/0030911 | A1 | 2/2004 | Isozaki et al. |
| 2004/0039924 | A1 | 2/2004 | Baldwin et al. |
| 2004/0044872 | A1 | 3/2004 | Scott |
| 2004/0221200 | A1 | 11/2004 | Armstrong et al. |
| 2004/0226009 | A1 | 11/2004 | Mese et al. |
| 2005/0132122 | A1 | 6/2005 | Rozas |
| 2005/0138417 | A1 | 6/2005 | McNerney et al. |
| 2005/0198051 | A1 | 9/2005 | Marr et al. |
| 2005/0213768 | A1* | 9/2005 | Durham et al. ............ 380/278 |
| 2005/0216577 | A1 | 9/2005 | Durham et al. |
| 2005/0278499 | A1 | 12/2005 | Durham et al. |
| 2005/0278563 | A1 | 12/2005 | Durham et al. |
| 2005/0289311 | A1 | 12/2005 | Durham et al. |
| 2006/0026569 | A1 | 2/2006 | Oerting et al. |
| 2006/0156398 | A1* | 7/2006 | Ross et al. ................... 726/22 |
| 2006/0161761 | A1 | 7/2006 | Schwartz et al. |
| 2006/0236125 | A1 | 10/2006 | Sahita et al. |
| 2006/0294596 | A1 | 12/2006 | Govindarajan et al. |
| 2007/0005935 | A1* | 1/2007 | Khosravi et al. ............ 711/216 |
| 2007/0005957 | A1 | 1/2007 | Sahita et al. |
| 2007/0005992 | A1 | 1/2007 | Schluessler et al. |
| 2007/0006175 | A1 | 1/2007 | Durham et al. |
| 2007/0006307 | A1 | 1/2007 | Hahn et al. |
| 2007/0156999 | A1 | 7/2007 | Durham et al. |

OTHER PUBLICATIONS

Non-Final Office Action mailed Jun. 20, 2007 for U.S. Appl. No. 11/428,335.
Final Office Action mailed Mar. 6, 2008 for U.S. Appl. No. 11/428,335.
Final Office Action mailed Feb. 13, 2008 for U.S. Appl. No. 11/173,142.
Non-Final Office Action mailed Apr. 1, 2009 for U.S. Appl. No. 11/173,851.
"Windows Platform Design Notes: Standardizing Out-Of-Band Management Console Output and Terminal Emulation (VT-UTF8 and VT100+)", Oct. 24, 2001, 15 pages, http://download.microsoft.com/download/1/6/1/161ba512-40e2-4cc9-843a-923143f3456c/StandardizingOutOfBandManagementConsoleOutput090.doc.
Apple Computer, Inc., "Mac OS X ABI Mach-o File Format Reference", Mar. 8, 2006 64 pages (copyright 2003, 2006 Apple, Inc.).
Collins, "Intel's System Management Mode", 1999, 8 pages, http://www.rcolling.org/ddj/Jan97/Jan97.html.
Draheim, "AMD64/EM64T—The Coming Market", May 4, 2004, 5 pages, http://www2.informatik.hu-berlin.de/~draheim/article/em64t.html.
Grevstad, "CPU-Based Security: The NX Bit", Juniperimages, May 24, 2004, 3 pages.
Khosravi, Hormuzd M., et al., "Dynamic Generation of Integrity Manifest for Run-Time Verification of Software Program", U.S. Appl. No. 11/967,928, filed Dec. 31, 2007, 41 pages.
Markatos, et al., "User-Level DMA without Operating System Kernel Modification", Feb. 1-5, 1997, pp. 322-331; High Performance Computer Architecture, 1999, IEEE 3rd International Symposium.
Microsoft Corp., "Microsoft Portable Executable and Common Object File Format Specification", Revision 6.0, Feb. 1999, 77 pages.
Notice of Allowance for U.S. Appl. No. 11/173,851 mailed Aug. 13, 2009.
P21710 NF OA Oct. 22, 2008, Non-Final Office Action mailed Oct. 22, 2008 for U.S. Appl. No. 11/173,142.
P21711X NFOA Oct. 20, 2008, Non-Final Office Action mailed Oct. 20, 2008 for U.S. Appl. No. 11/428,335.
P21721 NFOA Feb. 17, 2009, Non-Final Office Action mailed Feb. 17, 2009 for U.S. Appl. No. 11/174,315.
P21985 NFOA Dec. 5, 2008, Non-Final Office Action mailed Dec. 5, 2008 for U.S. Appl. No. 11/173,587.
Red Hat, Inc., "Red Hat Enterprise Linux 4: Using as, the Gnu Assembler", copyright 2004, 302 pages.
Sheveley, "Enhanced Vidualization on Intel Architecture-Based Servers", Technology@Intel Magazine, Apr. 2005, pp. 1-9.
The PC Guide, "Direct Memory Access (DMA) Modes and Bus Mastering DMA", Apr. 17, 2001; 3 pages; http://www.pcguide.com/ref/hdd/if/de/modesDMA-c.html.
Tools Interface Standards (TIS), "Executable and Linkable Format (ELF)", Portable Formats Specification, Version 1.1, 262 pages; TIS Committee, Oct. 1993.
Uhlig, Rich, et al., "Intel Virtualization Technology", IEEE Computer Society, May 2005, pp. 48-56.
Webopedia "Bus", Dec. 1, 2002, http://isp.webopedia.com/TERM/B/bus.html.
Webopedia, "DMA", Nov. 11, 2003, 2 pp., http://www.webopedia.com/TERM/DMA.html.
Webopedia, "Kernel", Mar. 12, 2002, 2 pages, http:www.webopedia.com/TERM/k/kernel.html.
Zhang, "Memory Management in Jikes Node Operating System", 2005, A thesis submitted to the University of Manchester for the degree of Master of Science in the Faculty of Science and Engineering, pp. 1, 27 and 29.
Non-Final Office Action mailed Aug. 21, 2009 for U.S. Appl. No. 11/322,669.
Duc, G. et al., "CryptoPage: An Efficient Secure Architecture with Memory Encryption, Integrity and Information Leakage Protection", Computer Security Applications Conference, 2006. ACSAC, 22nd Annual. Dec. 2006, pp. 483-492.
Levy, J. et al., "Hiding Your Wares: Transparently Retrofitting Memory Confidentiality into Legacy Applications", Communications, 2007. ICC, IEEE International Conference on Jun. 24-28, 2007, pp. 1368-1372.
Final Office Action mailed Jul. 15, 2009 for U.S. Appl. No. 11/173,142.
"Office Action", U.S. Appl. No. 11/173,815, office action mailed Jun. 20, 2007.
Notice of Allowance mailed Apr. 24, 2009 for U.S. Appl. No. 11/428,335.
"Notice of Allowance", U.S. Appl. No. 11/173,587, mailed May 1, 2009.
Final Office Action mailed Sep. 1, 2009 for U.S. Appl. No. 11/174,315.
Yan, Chenyu, et al., "Improving Cost, Performance, and Security of Memory Encryption and Authentication", Computer Architecture, 2006. ISCA, 33rd International Symposium, pp. 179-190.

* cited by examiner

US 7,669,242 B2

AGENT PRESENCE MONITOR CONFIGURED TO EXECUTE IN A SECURE ENVIRONMENT

BACKGROUND OF THE DISCLOSURE

Independent Software Vendors (ISVs) currently produce a large number of software applications that run within the operating system (OS) context and offer management services to Enterprise information technology (IT) departments. Among the products being offered are asset tracking, application monitoring, system performance monitoring and provisioning, intrusion detection systems, and local firewalls. These products are installed using an agent/console model where the agent executes on a local client and communicates with a remote console. The remote console typically runs on a remote machine located elsewhere in the network. Typically, for security applications, the host agents have a supervisor mode or ring-0 component and may have a user mode component.

These software products are continually subjected to complex and evolving attacks by malware seeking to gain control of computer systems. Attacks can take on a variety of different forms ranging from attempts to crash a software program to subversion of the program for alternate purposes. More advanced attacks can even attempt to modify the program, and subsequently try to hide the modification from the system owner. Unfortunately, it is not difficult for an attacker who has gained supervisory privileges to compromise the agent model, by corrupting the process code or its associated data in memory.

DETAILED DESCRIPTION

Embodiments of a method and system for detecting and confirming an agent presence are disclosed herein. One embodiment provides a method which operates to confirm an agent presence by providing a secure execution environment that is inaccessible by a host and independently secure. The secure execution environment is an execution environment that includes memory and executable code that cannot be accessed from a primary execution environment due to hardware restrictions. A secure environment includes, but is not limited to, a service processor, a virtual partition, an embedded microcontroller, and a system management mode or privileged execution state. The method includes executing a presence verifier from the secure execution environment. The method uses the presence verifier to monitor a signal communicated from the agent. Based on the monitored signal, an analysis determines an operational state of the agent. The method includes remote management applicability for monitoring a host agent. The method can be used to securely and confidently detect the presence of one or more software agents running in ring-0 (supervisory mode) and/or ring-3 within a host operating system.

Another embodiment provides a computer-readable medium which when executed in a system, securely confirms an agent presence. The confirmation uses a secure execution setting which is isolated from a host. A management engine can be executed from the secure execution setting. The management engine is used to monitor a signal communicated from an agent. Based on an analysis of the signal, a condition of the agent can be determined.

Another embodiment provides a system configured to validate an agent presence. The system includes a secure operating environment, and a management engine configured to execute from the secure operating environment. The management engine is further configured to monitor a signal issued from an agent associated with a host. Based on an analysis of the monitored signal, an operational condition of the agent can be determined.

Figure 1:
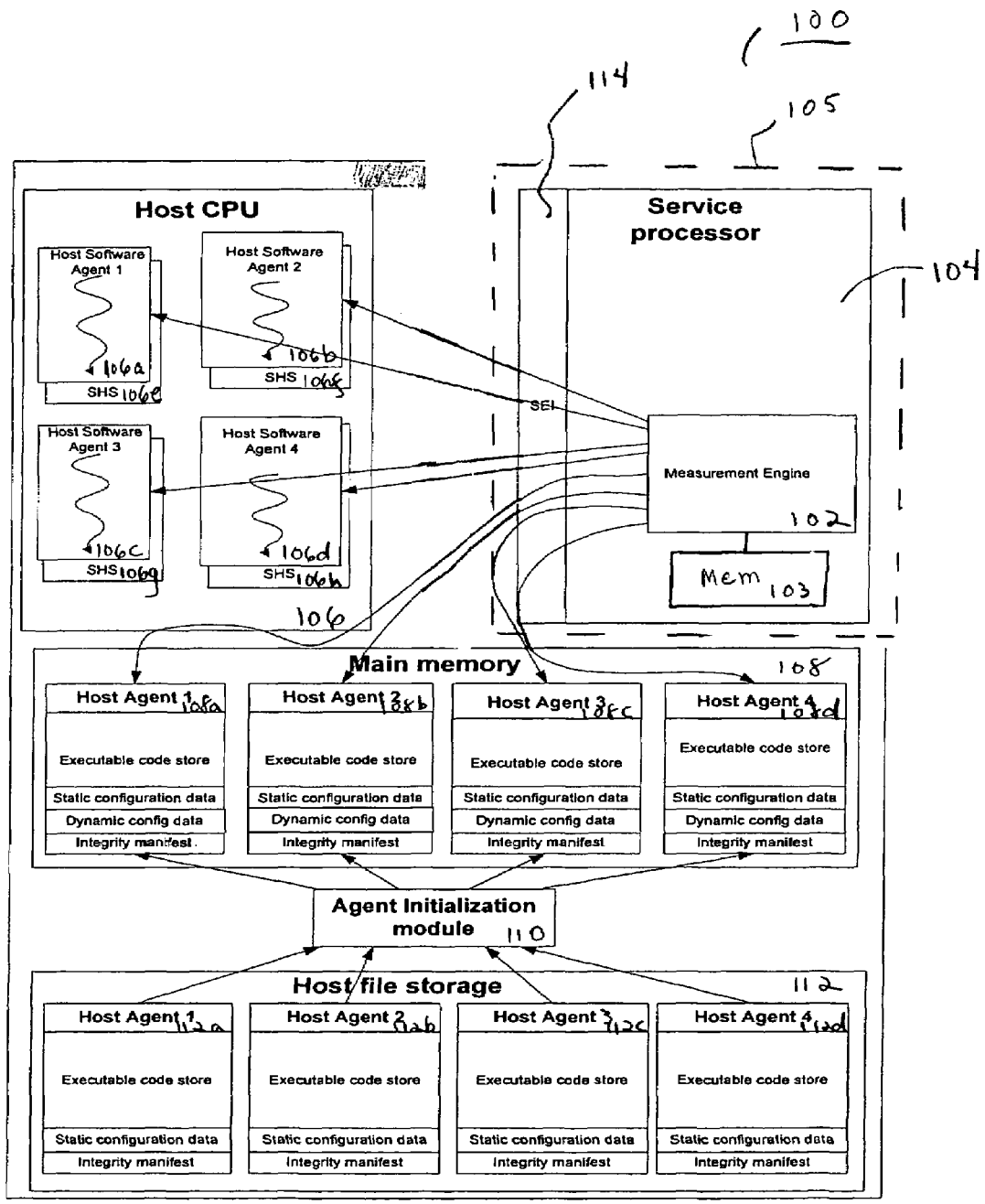
FIG. 1 is a functional block diagram of a host software agent measurement system according to an embodiment.

FIG. 1 is a functional block diagram of a host software agent measurement (HAM) system 100 according to an embodiment. FIG. 1 depicts a component level view of the HAM system 100 and a control flow between the components. The HAM system 100 can protect against threats aimed at undermining the integrity of a system. For example, the HAM system 100 is configured to protect against compromises of an operating system by detecting attacks against protected host software agents.

The HAM system 100 is designed to protect against a number of individual threats which arise from the foregoing, such as: a spoofed agent presence that arises when an attacker stops the protected agent from executing and attempts to fool the system into thinking the agent is still executing; denial of service attacks against the communication mechanism used to prove agent presence; modification of the protected software on the disk prior to it being loaded into memory; page table modifications that arise when an attacker changes the protected agent's page table entries so that the agent's virtual addresses point to physical pages under the attacker's control; measured agent attacks through modification of the agent's code store or static configuration data in memory or on disk; and, a termination of a measured agent's thread of execution, or prevention of running the measured agent's thread of execution. These threats are listed as examples, but are not meant to be limiting. The HAM system 100 is not limited to preventing solely the threats described herein.

The HAM system 100 includes a measurement engine (ME) 102 and associated memory 103. The ME 102 executes from a secure operating environment 105. In one embodiment, the secure operating environment 105 includes a service or management processor 104, but embodiments are not so limited. The service processor 104 provides a secure, isolated execution environment that operates independently of the host central processing unit (CPU) 106. The service processor 104 in various embodiments is a component of a personal computer, or any other processor-based wired or wireless device, such as a cellular phone or personal digital assistant or other mobile computing device. The service processor 104 may be coupled through a wired or wireless network to other processors and/or resources. The HAM system 100 also includes a number of protected host software agents 106a-106d (also termed measured agents) and associated secure host service (SHS) modules 106e-106h. While four protected host software agents 106a-106d are depicted in FIG. 1, it will be appreciated that the HAM system 100 can include any number of protected host software agents and the HAM system 100 is not limited to any certain number.

As described below, each protected host software agent is a program on the host which is protected from modification or termination by an attack or other threat. Agents include, but are not limited to, device drivers, kernel agents (such as firewalls), security services, or any other program requiring protection. Each secure host service module is configured to execute in a privileged execution mode. Additionally, the secure host service module is capable of running outside the context of an operating system (OS), thereby providing certain beneficial capabilities and security attributes. As discussed below, the ME 102 is configured to perform a number of functions, including integrity and execution detection checks on the protected host software agents 106a-106d (measured agents) and/or other directly measured host software agents to verify that the agents have not been tampered with and/or are still running.

With continuing reference to FIG. 1, the HAM system 100 includes main memory 108. A number of host agents 108a-108d reside in the main memory 108. Each host agent can include an executable code store, static configuration data, dynamic configuration data, and an integrity manifest. As used herein, the integrity manifest is a set of information which describes the identity of the program. The integrity manifest comprises an integrity check value (ICV) that includes a program's executable code store, static configuration data, and data encompassing a complete listing of relocation fix-ups (changes to the binary code of the program) that occur at the time the program is loaded into memory.

Relocation fix-ups can include both program address adjustment for non-zero segment origins (segment fix-ups), and external symbol resolution such as for dynamically linked libraries (symbol fix-ups). Generally, the format of the relocation fix-ups is object file format specific (ELF, common object file format (coff), assembler output (a.out), etc). The ICV can also include additional information which can be used by the ME 102. For example, the integrity manifest can include information allowing the ME 102 to perform a computation of the ICV (detailed below). The integrity manifest can be contained within the measured program or it can be stored on a remote server.

The HAM system 100 also includes an agent initialization module (AIM) 110. The AIM 110 is compiled into a protected host software agent and it performs services to enable the agent's measurement. The AIM 110 is configured to perform memory manipulation such as page pinning. The AIM 110 is further configured to handle the generation of resource data records (RDRs), to record relocation fix-up values, and to perform certain aspects of a registration process. For each section of the program, the AIM 110 records the region location in an RDR. In addition, the AIM 110 generates the integrity manifest. The AIM 110 makes the integrity manifest available to the ME 102. Moreover, as described below, the AIM 110 allocates a region of memory for use as the heartbeat counter which it exposes to the ME 102, via a memory scan RDR, for example. The AIM 110 describes each non-contiguous region which the agent uses for storage of the program or data in the measured agent's RDR. The HAM system 100 further includes host file storage 112. The host file storage 112 also includes a number of host agents 112a-112d. Each host agent can include an executable code store, static configuration data, and an integrity manifest.

Figure 2:
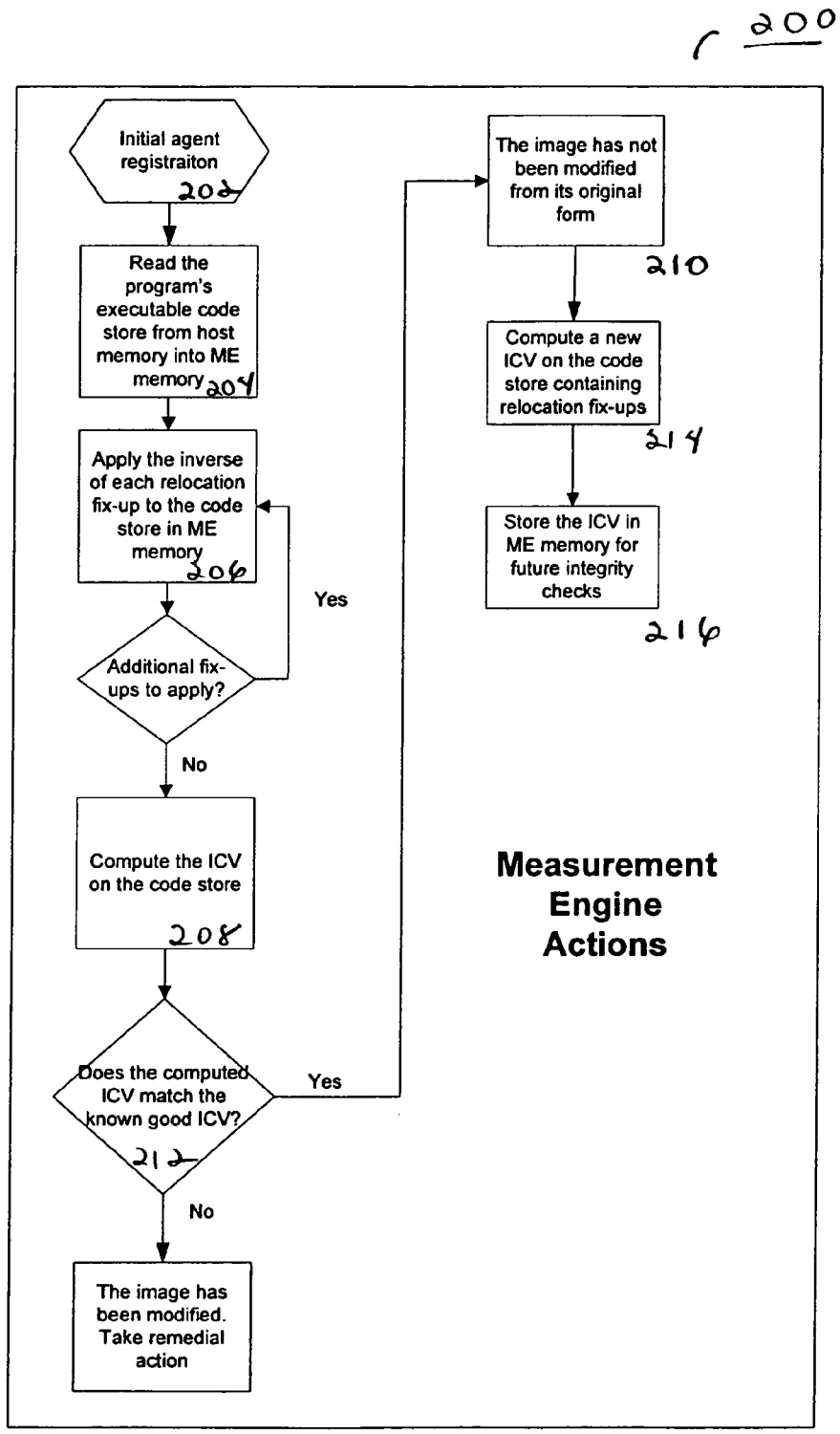
FIG. 2 is a flow diagram depicting registration of a host agent according to an embodiment.

FIG. 2 is a flow diagram depicting registration of a host agent according to an embodiment. Referring again to FIG. 1, the HAM system 100 includes a sensor interface (SEI) 114. The SEI 114 can be configured to discover the set of resources which can be accessed within one or more measured software agents. The SEI can be used each time new managed resources are added to the HAM system 100. The ME 102 can use the discovered resource to learn about the host agents to be measured and to register the software agent. FIG. 2 provides a flow of an initial registration process 200 according to an embodiment.

At 202, the initial registration process 200 begins with the ME 102 performing integrity checks on software agents. The registration time integrity check is performed by generating cryptographic hashes across regions which comprise the agent's identity (e.g., the integrity manifest, etc.). This can include, but is not limited to, the executable code, static configuration data, and relocation fix-ups, described above. The integrity manifest includes an ICV. The ICV (a cryptographic signature) signs the software integrity manifest. This signature can be generated at compile time. An individual ICV can be verified for each section of the executable code, for the configuration data, and for the integrity manifest. The ME 102 can retrieve the public key corresponding to the ICV from a valid Certificate Authority to verify a known good value of the ICV.

At 204, the ME 102 reads the associated program's executable code store (see FIG. 1) from the host memory 108 and stores it in the ME memory 103. In one embodiment, the ME 102 measures the code store via one or more direct memory access (DMA) memory scan resource data records (RDRs), described above. In an alternate embodiment, the ME 102 can securely gather enough information from the host to reconstruct the virtual to physical memory mappings of the pages which comprise the measured program.

At 206, according to this embodiment, the ME 102 applies the inverse of each relocation fix-up to the code store in the ME memory 103. For example, the ME 102 can walk through the list of relocation fix-ups in the integrity manifest and reverse the relocation process performed by the loader at the time the program was loaded. If there are additional relocation fix-ups, the flow cycles back to 206. If there are not additional relocation fix-ups, at 208, the ME 102 computes the ICV by generating cryptographic hashes on the code store in the ME memory 103. If the computed ICV matches the known good value, at 210, the ME 102 recognizes that the image has not been modified from its original form. Otherwise, at 212, the ME 102 determines that the image has been modified and can send out recognition alerts for subsequent remedial acts.

If the ME 102 recognizes that the image has not been modified, at 214, the ME 102 computes a new ICV on the code store containing the relocation fix-ups. Thereafter, at 216, the ME 102 stores the new ICV in ME memory 103 for future integrity checks. By generating a new ICV, the need to invert relocation fix-ups on every check can be eliminated. That is, if the first verification succeeds, this new ICV can be used by all subsequent verifications (discussed below). It will be appreciated that the generated ICV excludes relocation fix-ups, while the ICV included in the agent's integrity manifest is computed using fixed-up values. According to this embodiment, the ME 102 computes a cryptographic hash over the agent's executable code and static configuration data when generating the new ICV.

Figure 3:
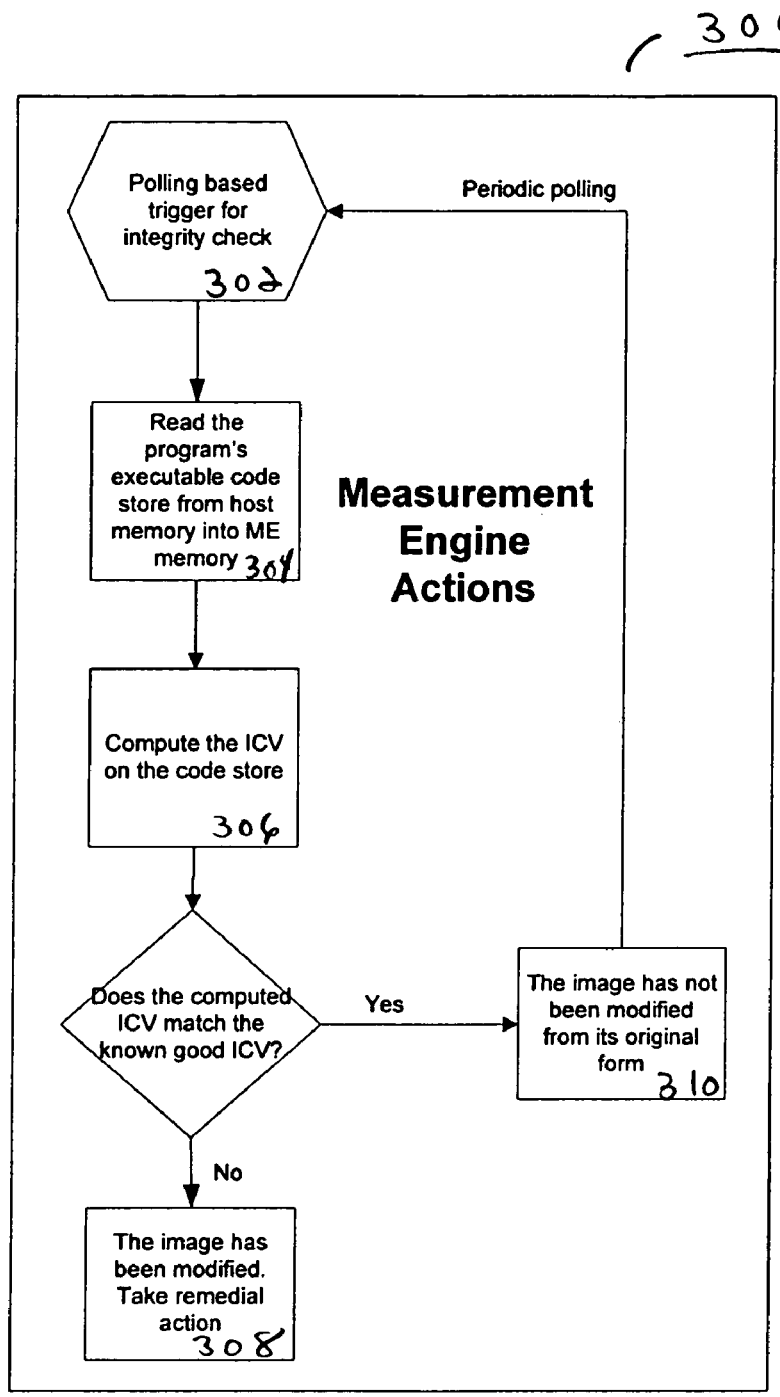
FIG. 3 is a flow diagram depicting a periodic integrity check of a host agent according to an embodiment.

FIG. 3 is a flow diagram which depicts the ME 102 performing a periodic or subsequent integrity check process 300 to detect attacks which might change protected attributes of an associated program, according to an embodiment. At 302, the ME 102 issues a polling based trigger for the subsequent integrity check process 200. At 304, the ME 102 reads the executable code store of the agent from the host memory 108 and stores the code store in the ME memory 103. At 306, the ME 102 computes the ICV on the code store in the ME memory 103. If the computed ICV does not match the known good ICV, at 308, ME 102 determines that the image has been modified and can send out recognition alerts for subsequent remedial acts. If the ME 102 determines that the image has not been modified, at 310, the flow cycles back to 302. In an alternate embodiment, the ME 102 is further configured to perform integrity checks in an event driven manner (e.g., when the ME 102 determines that an attempted change is being made to the protected attributes of a program).

Figure 4:
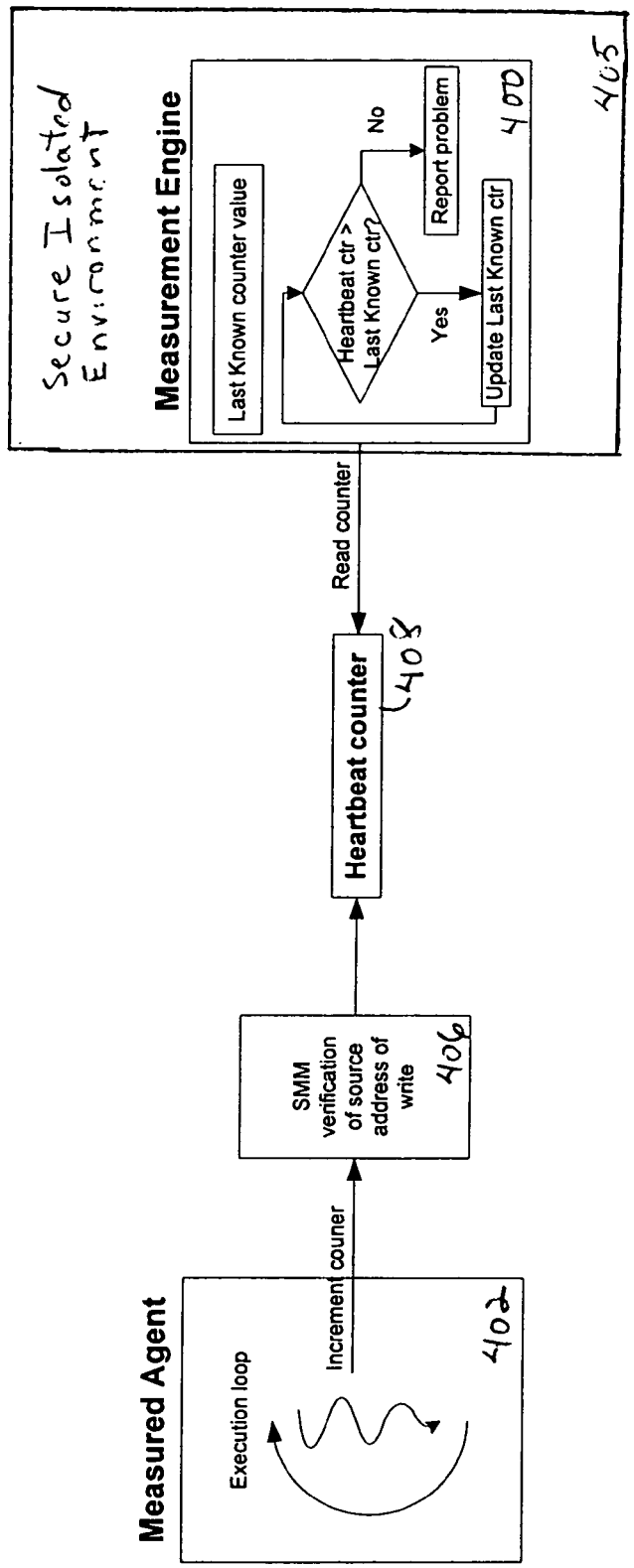
FIG. 4 is a functional block diagram depicting a measurement engine interacting with a measured software agent according to an embodiment.

FIG. 4 is a functional block diagram depicting a ME 400 interacting with a measured software agent 402 according to an embodiment. The ME 400 resides on a secure isolated execution environment 405, such as a service processor, virtual partition, embedded microcontroller, etc. The measured software agent 402 can generate an indicator or signal, periodically or otherwise, which the ME 400 can analyze to detect agent presence/execution and/or determine if the measured software agent 402 has been tampered with or otherwise compromised. According to this embodiment, the measured software agent 402 generates a heartbeat message by publishing a DMA memory scan RDR that identifies a location which contains a unique identifier. For example, the unique identifier can comprise a cryptographically signed monotonically increasing counter. It will be appreciated that other algorithmic functions can be used to represent the unique identifier as well.

The location of the unique identifier is provided to a privileged execution component 406 (see SHS of FIG. 1) through the ME 400 during registration of the measured software agent 402, as described above. The privileged execution component 406 is configured to provide verification of the source of heartbeat update requests. In order to verify the source of heartbeat update requests, the privileged execution component 406 maintains a list of measured segments which correspond with the agents registered with the ME 400. A measured segment could be executable code, static configuration data, or dynamic configuration data. These segments can be represented by <Base, Limit> address pairs in physical memory. Each agent may only be allowed to initiate a request to update its heartbeat while executing within one of its measured segments. The privileged execution component 406 enforces this by considering as erroneous behavior any heartbeat update request that is initiated from a source address outside the registered measured segments. Policy-driven remediation action can be taken in response to detected erroneous behavior.

The privileged execution component 406 is further configured to provide the secure update of a unique identifier, such as a heartbeat counter 408. A counter can be incremented by the privileged execution component 406 upon a request by the measured software agent 402, periodically or otherwise, after the source of the request has been verified. For example, the privileged execution component 406 can sign a monotonically increasing 64-bit counter using a secret (provisioned key) that is shared with the ME 400 to securely update the heartbeat counters. The host is prevented from obtaining the secret by virtue of the privileged execution component 406 and the secure isolated environment 405 being the only components that include the secret and the host having no way to access the code and/or memory of these components 405 and 406.

The ME 400 can then access the counter for verification. If the heartbeat counter is not different (according to the applied algorithmic function) than the last known value, then the ME 400 is configured to report a problem, remediation of the problem may be initiated. It will be appreciated that the privileged execution component 406 will only allow the measured software agent 402 (as defined by its execution location in memory) to request updating of the heartbeat counter. Thus, a host-based agent is prevented from correctly updating the counter, since the key used to sign the counter is stored in a secure location that cannot be accessed by host applications.

Figure 5:
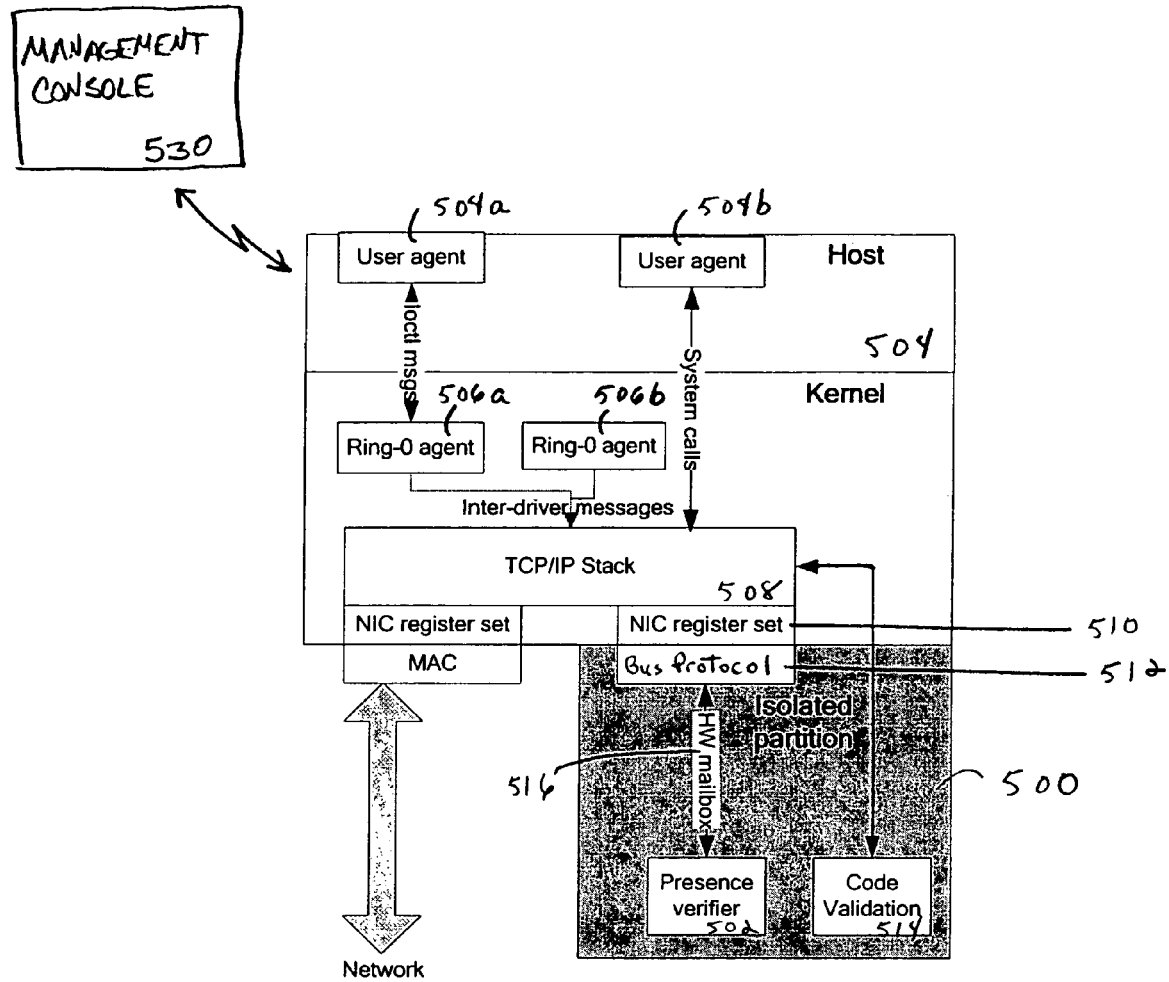
FIG. 5 is a functional block diagram of an isolated partition configured to interface with an agent according to an embodiment.

FIG. 5 is a functional block diagram of an isolated partition 500 configured to interface with a number of host software agents according to an embodiment. As shown in FIG. 5, a presence verifier 502 is configured to execute on the isolated partition 500. In one embodiment, the presence verifier 502 and a code validation block 514 encompass the functionality of the measurement engine as previously described. The isolated partition 500 is a secure and independent execution environment and is isolated from the host 504. The presence verifier 502, when executing within the isolated partition 500, can securely detect the presence and associated functionality of a software agent. The software agent, for example, may include an agent running in ring-0 within a host operating system. The presence verifier 502 can be included as part of a management engine or as a separate module. For example, presence verifier 502 can be configured to determine if a host agent has not started, or if the host agent started and subsequently stopped unexpectedly. The presence verifier 502 can execute on the isolated partition 500 to detect worms or viruses which attack and disable critical host software agents such as firewalls, anti-virus software, etc.

A kernel 506 is also shown having a number of ring-0 agents 506a and 506b. The kernel 506 typically includes management functionality associated with an operating system. A number of host software or user agents 504a and 504b can execute on the host 504. Host agent 504a can issues ioctl messages to an associated ring-0 agent 506a, for example. The icotl messages can include a heartbeat signal, as described above. Host agent 504b can issue system calls to a transmission control protocol/Internet protocol (TCP/IP) stack 508. Ring-0 agents 506a and 506b issue inter-driver messages to the TCP/IP stack 508.

As described above, one or more of the host agents 504a and 504b can share a privileged key with the presence verifier 502. The shared privileged key, represented by code validation block 514, can include the identity of a host agent. The presence verifier can use the key to verify that the source of the heartbeat signals is authentic and has not been compromised by an unauthorized entity. The TCP/IP stack 508 interfaces with the isolated partition 500 via a network interface card (NIC) register set 510 and a bus protocol 512. The NIC register set 510 can be configured to provide peripheral component interconnect (PCI) functionality through a set of registers. The bus protocol 512 serves as an interface between the host 504 and the isolated partition 500. The heartbeat signal is communicated to the presence verifier 502 through a hardware mailbox 516 via the TCP/IP stack 508, NIC register set 510, and bus protocol 512. Simple configuration of kernel route tables can ensure that specific messages sent using standard TCP/IP protocols are sent over the hardware mailbox 516 to the isolated partition 500.

When the presence verifier 502 detects a problem with a software agent of the host 504 as a result of detecting a heartbeat failure, the presence verifier 502 can initiate any of a diverse set of pre-programmed remediation actions. The remediation actions include for example notifying a management console 530 or remote administrator to the failure, but are not so limited.

Figure 6:
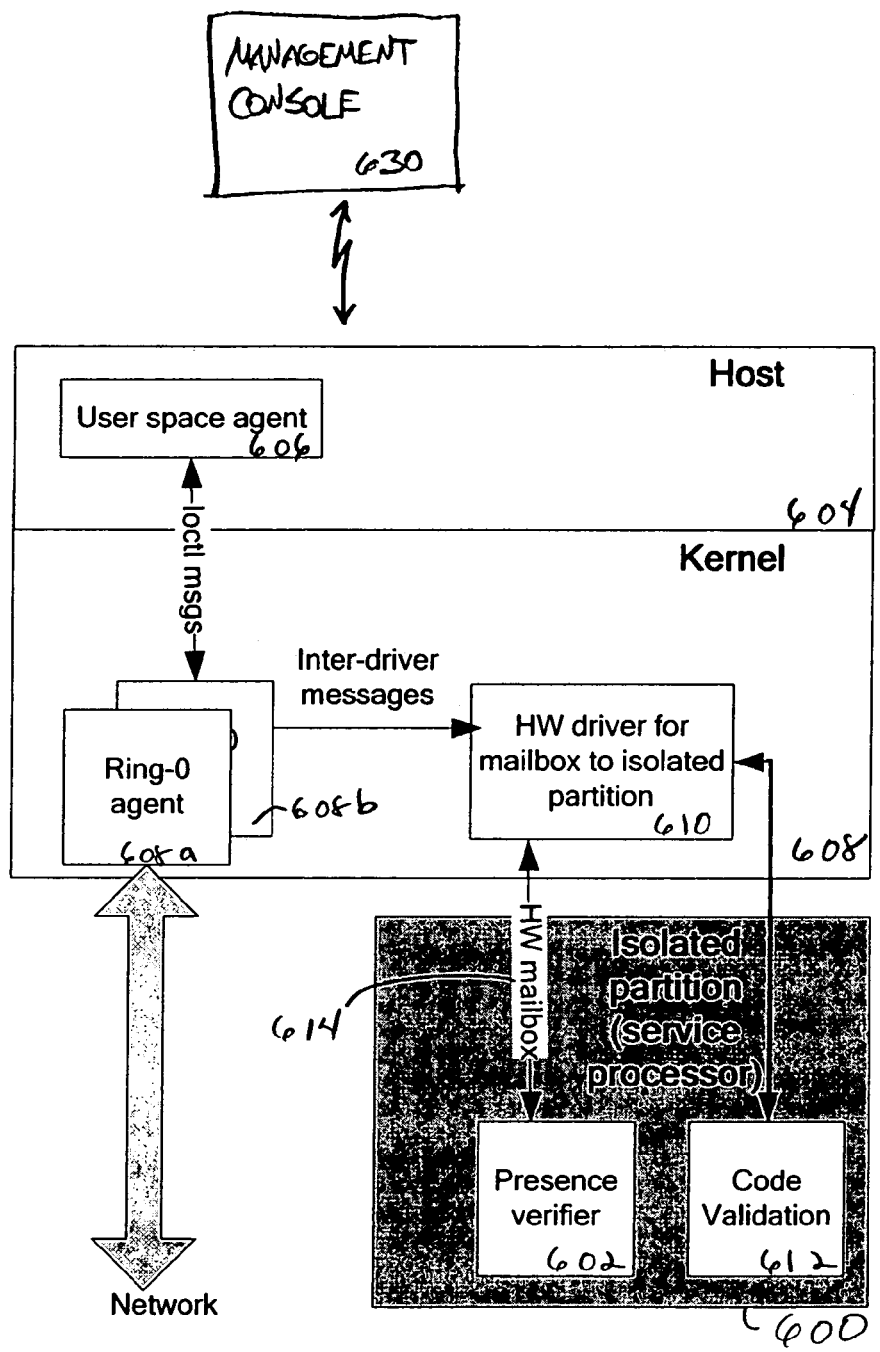
FIG. 6 is a functional block diagram of an isolated partition configured to interface with an agent according to another embodiment.

FIG. 6 is a functional block diagram of an isolated partition 600 or service processor configured to interface with a number of host software agents according to an embodiment. In FIG. 6, only one host agent 606 is shown for simplicity. As shown in FIG. 6, a presence verifier 602 is configured to execute on the isolated partition 600. In one embodiment, the presence verifier 602 and a code validation block 614 encompass the functionality of the measurement engine as previously described. The isolated partition 600 is a secure and independent execution environment and is isolated from the host 604. The presence verifier 602, when executing within the isolated partition 600, can securely detect the presence and associated functionality of a host software agent 606, running in ring-0 within a host operating system for example. The presence verifier 602 can be included as part of a management engine or as a separate module. For example, presence verifier 602 can be configured to determine if the host agent 606 has not started, or if the host agent 606 started and subsequently stopped unexpectedly.

A kernel 608 is also shown having a number of ring-0 agents 608a and 608b. The kernel 608 typically includes management functionality associated with an operating system. The host agent 606 can issue ioctl messages to an associated ring-0 agent 608b, for example. The icotl messages can include a heartbeat signal or other verification signal, as described above. Ring-0 agent 608b communicates with a hardware driver 610 using inter-driver messages.

As described above, the host agent 606 can include identification properties which are shared with the presence verifier 602 after completing a registration process. The shared secure identification properties, represented by code validation block 612, can include the identity of the host agent 606, described above. The presence verifier 602 can use the properties to verify that the source of the heartbeat signals is authentic and has not been compromised by an unauthorized entity. The hardware driver 610 interfaces with the isolated partition 600 via a hardware mailbox 614. The heartbeat signal is communicated to the presence verifier 602 through the hardware mailbox 614. The presence verifier 602, which monitors the heartbeat or other signal issued from the host agent 606, is difficult to compromise due to the secure operating environment in the form of the isolated partition 600.

When the presence verifier 602 detects a problem with a software agent of the host 604 as a result of detecting a heartbeat failure, the presence verifier 602 can initiate any of a diverse set of pre-programmed remediation actions. The remediation actions include for example notifying a management console 630 or remote administrator to the failure, but are not so limited.

Figure 7:
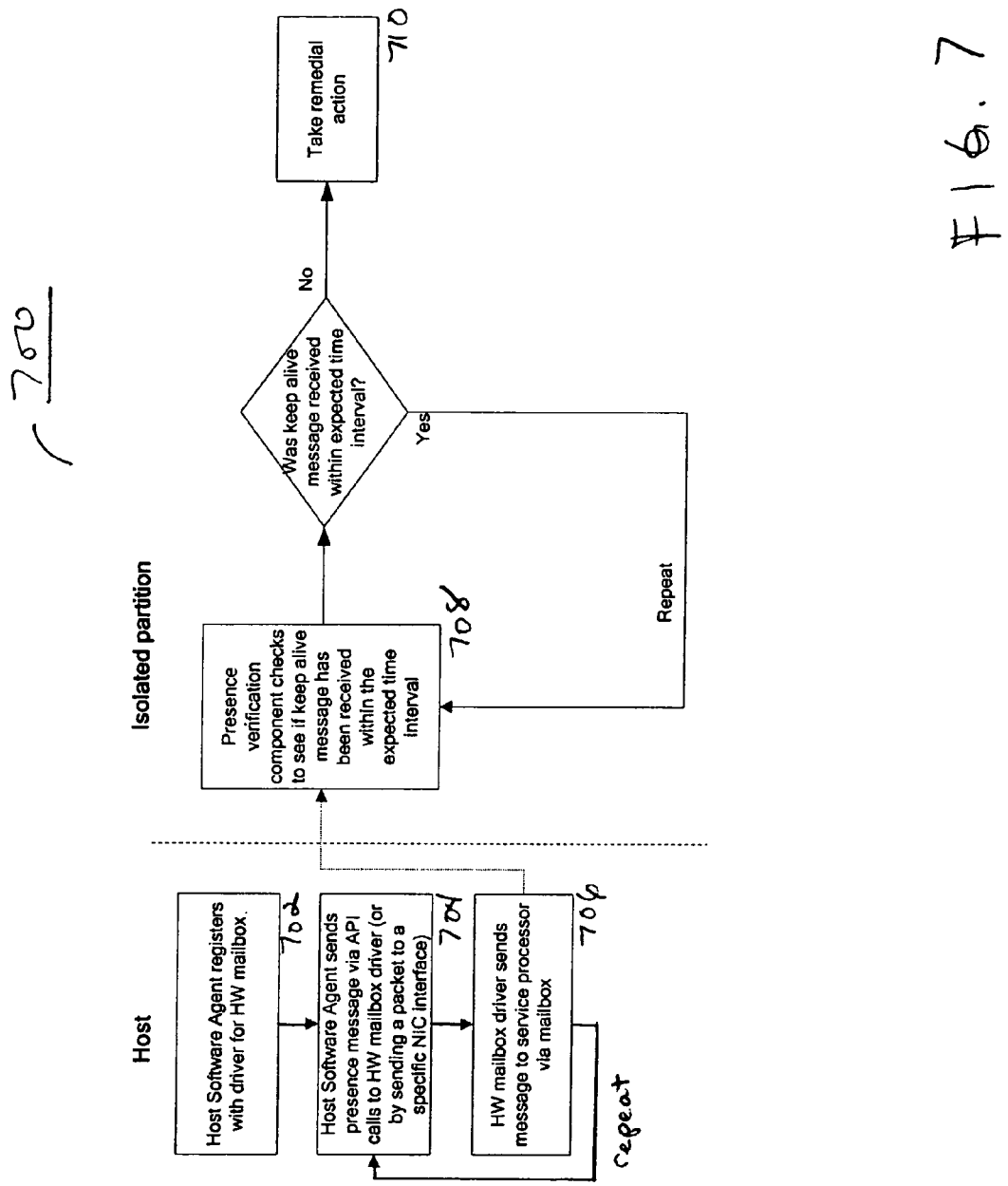
FIG. 7 is flow diagram of a method of verification of agent presence according to an embodiment.

FIG. 7 is flow diagram of a method 700 of the verification of an agent presence according to an embodiment. At 702, a host agent registers with a driver of the hardware mailbox. The driver could be the TCP/IP stack 508 of FIG. 5, the hardware driver 610 of FIG. 6, or a different driver. At 704, the host agent sends a presence message (heartbeat signal, for example) to the driver. For example, the host agent can send a presence message via application program interface (API) calls to a hardware mailbox driver. As another example, the host agent can send a presence message through a packet transmission to a NIC interface.

At 706, the driver sends the presence message to a secure execution environment via a hardware mailbox. The method 700 reverts back from 706 to 704, periodically or at some other interval. At 708, a presence verification component checks to see if an identifier message (heartbeat signal, for example) has been received with an expected period. If the message was not received with the expected period, at 710, the presence verifier can issue commands so that remedial action may be taken. Otherwise, the method 700 reverts back to 708, periodically or within some other interval.

The agent confirmation and verification techniques described herein are not limited to the specific example embodiments shown and described.

Aspects of the methods and systems described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Implementations may also include microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, etc.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list; all of the items in the list; and any combination of the items in the list.

The above description of illustrated embodiments is not intended to be exhaustive or limited by the disclosure. While specific embodiments of, and examples for, the agent presence confirmation and validation are described herein for illustrative purposes, various equivalent modifications are possible, as those skilled in the relevant art will recognize. The teachings provided herein can be applied to other systems and methods, and not only for the systems and methods described above. The elements and acts of the various embodiments described above can be combined to provide further embodiments. These and other changes can be made to methods and systems in light of the above detailed description.

In general, in the following claims, the terms used should not be construed to be limited to the specific embodiments disclosed in the specification and the claims, but should be construed to include all systems and methods that operate under the claims. Accordingly, the method and systems are not limited by the disclosure, but instead the scope is to be determined entirely by the claims. While certain aspects are presented below in certain claim forms, the inventors contemplate the various aspects in any number of claim forms. For example, while only one aspect is recited as embodied in machine-readable medium, other aspects may likewise be embodied in machine-readable medium. Accordingly, the inventors reserve the right to add additional claims after filing the application to pursue such additional claim forms for other aspects as well.

What is claimed is:

1. A method comprising:
   executing a presence verifier from a secure execution environment of a system, wherein the secure execution environment comprises at least one of a service processor, a virtual partition, an embedded microcontroller, and a system management mode;
   performing an integrity check for an agent via the presence verifier, wherein
      the agent is loaded from a host memory of the system into a main memory of the system,
      the main memory of the system is external to the secure execution environment, and
      the integrity check includes verifying the image of the agent in main memory matches the image of the agent in the host memory of the system;
   registering the agent with the presence verifier in response to the agent passing the integrity check;
   using the presence verifier to monitor a signal communicated from the agent, the signal to include information identifying the agent;
   analyzing the signal to determine the agent is present and operational;
   verifying the signal originates from the agent registered with the presence verifier based on the identification information included in the signal; and
   initiating a remediation action in response to a failure of one of the integrity check, the determination that the agent is present and operational, and the verification that the signal originates from the agent.

2. The method of claim 1, further comprising communicating the signal from the agent to the presence verifier through a network interface controller.

3. The method of claim 1, further comprising communicating the signal from the agent to the presence verifier through a hardware driver interfacing with registers associated with the secure execution environment.

4. The method of claim 1, wherein the signal from the agent comprises an encrypted signal.

5. The method of claim 4, further comprising using the presence verifier to authenticate the encrypted signal.

6. The method of claim 1, wherein registering the agent includes generating a cryptographic hash of an identification region associated with an identity of the agent.

7. The method of claim 1, further comprising using the presence verifier to monitor a monotonically increasing counter communicated from the agent.

8. A computer-readable medium having stored thereon instructions, which when executed in a system confirm an agent presence, wherein the confirmation comprises:
   executing a management engine from a secure execution environment of a system, wherein the secure execution environment comprises at least one of a service processor, a virtual partition, an embedded microcontroller, and a system management mode;
   performing an integrity check for an agent via the management engine, wherein
      the agent is loaded from a host memory of the system into a main memory of the system,
      the main memory of the system is external to the secure execution environment, and
      the integrity check includes verifying the image of the agent in main memory matches the image of the agent in the host memory of the system;
   registering the agent with the management engine in response to the agent passing the integrity check;
   using the presence verifier to monitor a signal communicated from the agent, the signal to include information identifying the agent;
   analyzing the signal to determine the agent is present and operational;
   verifying the signal originates from the agent registered with the presence verifier based on the identification information included in the signal; and
   initiating a remediation action in response to a failure of one of the integrity check, the determination that the agent is present and operational, and the verification that the signal originates from the agent.

9. The medium of claim 8, wherein the confirmation further comprises communicating the signal from the agent to the management engine through a network interface controller.

10. The medium of claim 8, wherein the confirmation further comprises communicating the signal from the agent to the management engine through a hardware driver interfacing at least one register associated with the secure execution setting.

11. The medium of claim 8, wherein the signal from the agent comprises an encrypted signal to the management engine.

12. The medium of claim 11, wherein confirmation further comprises configuring the management engine to read the encrypted signal issued from the agent.

13. The medium of claim 8, wherein registering the agent comprises using a one-way cryptographic hash associated with an identification property of the agent.

14. A system configured to validate an agent presence, the system comprising:
   a secure operating environment that comprises at least one of a service processor, a virtual partition, an embedded microcontroller, and a system management partition;
   a host memory;
   a main memory external to the secure operating environment;
   an agent loaded from the host memory to the main memory; and
   a management engine configured to execute from the secure operating environment, the management engine further configured to,
      perform an integrity check for an agent via the management engine, wherein the integrity check includes verifying the image of the agent in main memory matches the image of the agent in the host memory of the system, register the agent with the management engine in response to the agent passing the integrity check, monitor a signal issued from the agent the signal to include information identifying the agent, analyze the signal to determine the agent is present and operational, verify the signal originates from the agent registered with the management engine based on the identification information included in the signal, and initiate a remediation action in response to a failure of one of the integrity check, the determination that the agent is present and operational, and the verification that the signal originates from the agent.

15. The system of claim 14, further comprising a network interface controller which provides a communication channel between the agent and the management engine.

16. The system of claim 14, further comprising a hardware driver which provides a communication channel between the agent and the management engine.

17. The system of claim 14, further configured to register the agent by generating a cryptographic hash associated with an identity of the agent.

18. The system of claim 14, wherein the agent is further configured to issue a monotonically increasing counter signal.

19. The system of claim 14, wherein the signal from the agent comprises an encrypted signal.

* * * * *

UNITED STATES PATENT AND TRADEMARK OFFICE
CERTIFICATE OF CORRECTION

PATENT NO. : 7,669,242 B2  
APPLICATION NO. : 11/171859  
DATED : February 23, 2010  
INVENTOR(S) : Sahita et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1115 days.

Signed and Sealed this

Fourth Day of January, 2011

David J. Kappos  
*Director of the United States Patent and Trademark Office*